United States Patent
Arroyo et al.

(10) Patent No.: US 9,762,514 B2
(45) Date of Patent: Sep. 12, 2017

(54) GENERATING INSTANT MESSAGING CONTACTS FOR CUSTOMER RELATIONSHIP MANAGEMENT SYSTEMS

(71) Applicant: International Business Machines Corporation, Armonk, NY (US)

(72) Inventors: Jorge A. Arroyo, Carmel, IN (US); Stephen P. Kruger, Malahide (IE); Patrick J. O'Sullivan, Ballsbridge (IE); Luciano M. P. da Silva, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 13/912,746

(22) Filed: Jun. 7, 2013

(65) Prior Publication Data

US 2014/0351347 A1    Nov. 27, 2014

Related U.S. Application Data

(63) Continuation of application No. 13/898,785, filed on May 21, 2013.

(51) Int. Cl.
*H04L 12/24* (2006.01)
*H04L 12/58* (2006.01)

(52) U.S. Cl.
CPC .......... *H04L 51/046* (2013.01); *H04L 51/04* (2013.01)

(58) Field of Classification Search
CPC ......... H04L 51/04; H04L 51/14; H04L 61/15; H04L 51/046; H04L 51/043; H04L 12/5815; H04L 12/58; H04L 12/581; H04L 61/1523; G06Q 10/107
See application file for complete search history.

(56) References Cited

U.S. PATENT DOCUMENTS

| | | | |
|---|---|---|---|
| 6,049,776 A | 4/2000 | Donnelly et al. | |
| 7,200,638 B2 * | 4/2007 | Lake | 709/206 |
| 7,765,265 B1 * | 7/2010 | Granito et al. | 709/206 |
| 8,005,897 B1 * | 8/2011 | Roka | G06Q 10/10 |
| | | | 709/205 |
| 8,117,302 B2 * | 2/2012 | Smyth et al. | 709/224 |
| 8,140,619 B2 * | 3/2012 | Lyle et al. | 709/204 |
| 8,244,672 B1 * | 8/2012 | Thenthiruperai | H04W 4/001 |
| | | | 707/621 |
| 9,009,673 B2 * | 4/2015 | Bates | G06F 9/44 |
| | | | 717/125 |
| 9,053,443 B2 * | 6/2015 | Chmiel | G06Q 10/06 |
| 9,218,629 B2 | 12/2015 | Hartzler | |

(Continued)

*Primary Examiner* — Jimmy H Tran
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and computing system is provided for the interaction between a CRM system and a instant messaging system. According to an implementation, a computer-implemented method may include identifying, by one or more processors, one or more individuals associated with an opportunity included within a CRM system. The method may also include creating, by the one or more processors, an instant message buddy list group associated with the opportunity. The method may also include populating, by the one or more processors, the instant message buddy list group with at least a portion of the one or more individuals.

9 Claims, 8 Drawing Sheets

(56) References Cited

U.S. PATENT DOCUMENTS

| | | |
|---|---|---|
| 2003/0028524 A1* | 2/2003 | Keskar et al. .................... 707/3 |
| 2004/0196315 A1 | 10/2004 | Swearingen et al. |
| 2006/0167991 A1* | 7/2006 | Heikes .................. H04L 12/581 |
| | | 709/204 |
| 2007/0124386 A1 | 5/2007 | Klassen |
| 2008/0133580 A1 | 6/2008 | Wanless et al. |
| 2009/0049135 A1* | 2/2009 | O'Sullivan et al. .......... 709/206 |
| 2010/0057767 A1* | 3/2010 | Fridman et al. .............. 707/102 |
| 2010/0094837 A1* | 4/2010 | O'Sullivan .......... G06Q 10/107 |
| | | 707/705 |
| 2010/0121684 A1* | 5/2010 | Morio .................... G06Q 30/02 |
| | | 705/7.13 |
| 2010/0125580 A1* | 5/2010 | Westen et al. ................. 707/737 |
| 2010/0318622 A1* | 12/2010 | Granito et al. ............... 709/206 |
| 2010/0332584 A1* | 12/2010 | Koul et al. .................... 709/203 |
| 2012/0143969 A1 | 6/2012 | Shenoy et al. |
| 2012/0173636 A1 | 7/2012 | O'Sullivan et al. |
| 2012/0179971 A1* | 7/2012 | Appelman .................... 715/733 |
| 2013/0018982 A1* | 1/2013 | McConnell et al. .......... 709/217 |
| 2013/0036138 A1 | 2/2013 | Bellows et al. |
| 2013/0110932 A1 | 5/2013 | Itani et al. |
| 2014/0040383 A1* | 2/2014 | Dura et al. .................... 709/206 |
| 2014/0096033 A1* | 4/2014 | Blair ........................ G06F 3/01 |
| | | 715/752 |
| 2014/0108091 A1* | 4/2014 | Appleman ........ G06F 17/30578 |
| | | 705/7.29 |
| 2014/0108398 A1* | 4/2014 | Appleman ........ G06F 17/30578 |
| | | 707/736 |
| 2014/0244708 A1* | 8/2014 | Taine ...................... H04L 65/40 |
| | | 709/201 |
| 2015/0046233 A1* | 2/2015 | Srulowitz ........ G06Q 10/06398 |
| | | 705/7.42 |

* cited by examiner

GENERATING INSTANT MESSAGING CONTACTS FOR CUSTOMER RELATIONSHIP MANAGEMENT SYSTEMS

RELATED APPLICATIONS

The subject application is a continuation application of U.S. patent application with Ser. No. 13/898,785, filed on May 21, 2013, the entire content of which is herein incorporated by reference.

TECHNICAL FIELD

The present disclosure generally relates to systems and method for social customer relationship management and instant messaging.

BACKGROUND

When an enterprise, such as a company or an organization interacts with customers, a customer relationship management (CRM) system may be utilized to maintain these interactions. A CRM system may allow an enterprise to make better and quicker business decisions while organizing customer activities and marketing efforts. Customer opportunities may be created within the CRM system in order to continue to manage the relationship with the customer. In some situations a separate system may be utilized in conjunction with a CRM system in order to continue to manage and track customer opportunities.

SUMMARY OF DISCLOSURE

According to an implementation, a computer-implemented method may include identifying, by one or more processors, one or more individuals associated with an opportunity included within a CRM system. The method may also include creating, by the one or more processors, an instant message buddy list group associated with the opportunity. The method may also include populating, by the one or more processors, the instant message buddy list group with at least a portion of the one or more individuals.

One or more of the following features may be included. The method may further include propagating the instant message buddy list group to at least one of the one or more individuals. Propagating the instant message buddy list group may be based on one or more rules. The method may further include identifying a change to the one or more individuals associated with the opportunity. The method may also include updating the instant message buddy list group based on the change. Updating the instant message buddy list group may include removing an individual from the instant message buddy list group. Updating the instant message buddy list group may include adding an individual to the instant message buddy list group. The method may further include propagating the updated instant message buddy list group to at least one of the one or more individuals.

According to another implementation, a computer program product may include a computer readable medium having a plurality of instructions stored thereon. When executed by a processor, the instructions may cause the processor to perform operations including identifying one or more individuals associated with an opportunity included within a CRM system. Instructions may be included for creating an instant message buddy list group associated with the opportunity. Instructions may be included for populating the instant message buddy list group with at least a portion of the one or more individuals.

One or more of the following features may be included. The computer program product may further include instructions for propagating the instant message buddy list group to at least one of the one or more individuals. Propagating the instant message buddy list group may be based on one or more rules. The computer program product may further include instructions for identifying a change to the one or more individuals associated with the opportunity, and updating the instant message buddy list group based on the change. Updating the instant message buddy list group may include removing an individual from the instant message buddy list group. Updating the instant message buddy list group may include adding and individual to the instant message buddy list group. The computer program product may further include instructions for propagating the updated instant message buddy list group to at least one of the one or more individuals.

According to another aspect of the disclosure, a computing system may include one or more processor devices and one or more memory architectures coupled with the one or more processor devices. The one or more processor devices may be configured to identify one or more individuals associated with an opportunity included within a CRM system. The one or more processor devices may also be configured to create an instant message buddy list group associated with the opportunity. The one or more processor devices may also be configured to populate the instant message buddy list group with at least a portion of the one or more individuals.

One or more of the following features may be included. The one or more processor devices may be configured to propagate the instant message buddy list group to at least one of the one or more individuals. The one or more processor devices may be configured to identify a change to the one or more individuals associated with the opportunity. The one or more processor devices may be configured to update the instant message buddy list group based on the change. Updating the instant message buddy list group may include removing an individual from the instant message buddy list group. Updating the instant message buddy list group may include adding an individual to the instant message buddy list group. The one or more processor devices may be configured to propagating the updated instant message buddy list group to at least one of the one or more individuals.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
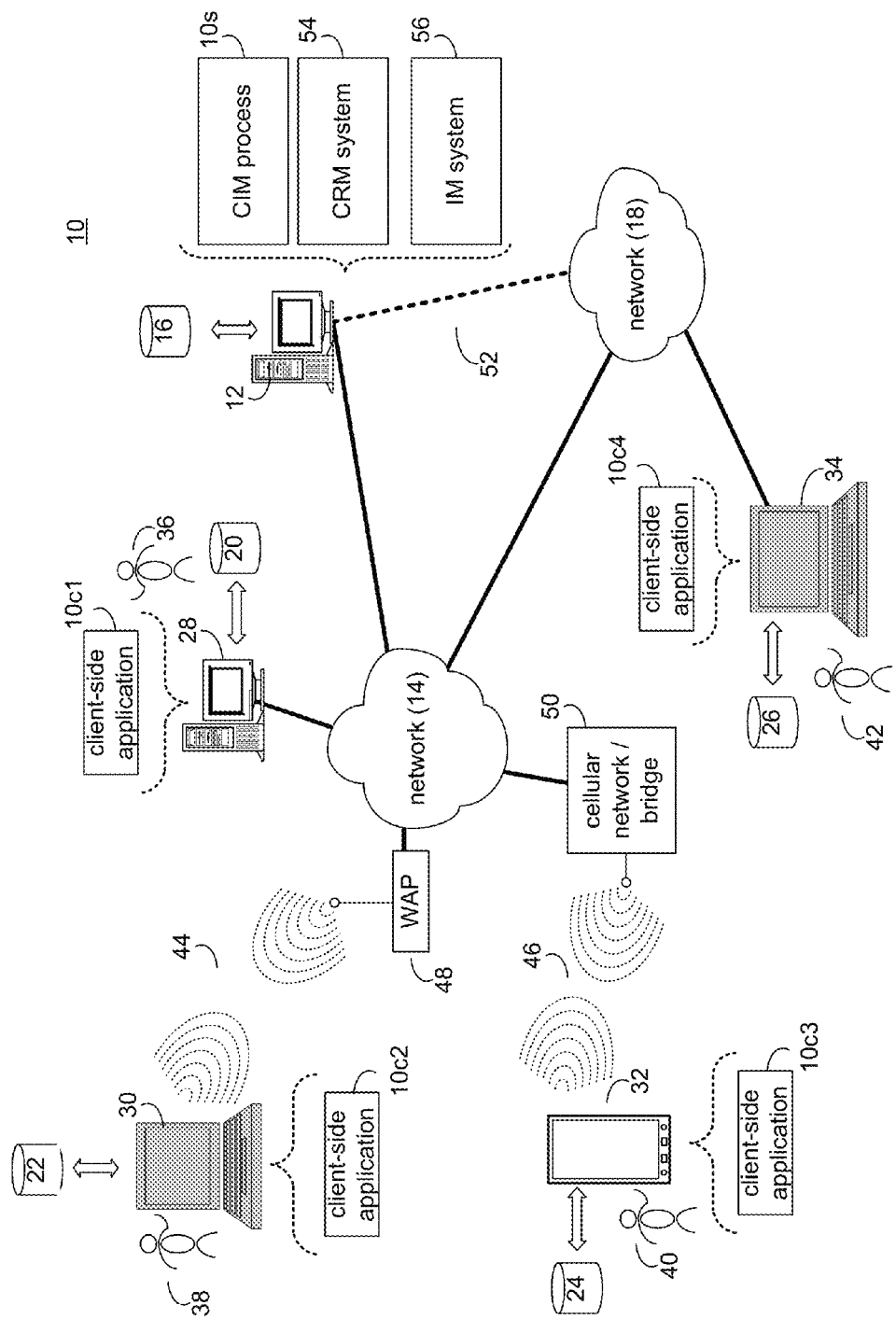
FIG. 1 is a diagrammatic view of a distributed computing network including a computing device that executes a CIM process according to an implementation of the present disclosure.

A CRM system may be considered a model for managing a company's interactions with current and potential future customers and/or business partners, or the like. Such a CRM system may involve using technology to organize, automate, and synchronize sales, marketing, customer service, and technical support information, activities, and the like. A CRM system may facilitate sales, marketing and service or support-based functions whose purpose may be to move the customer through a pipeline with the goal of keeping the customer coming back for repeat business, and/or generate business from potential customers. In some instances, it may be desirable to utilize a CRM system to keep track of these customers (e.g., existing customers, potential future customers, business partners, or the like) in the form of opportunities. An opportunity may be potential for new or additional sales, interactions, services, leads that may be exploited, or the like with respect to a customer included within the CRM system. A CRM system may be based around data and information that companies may collect about their customers, potential customers, business partners, or the like. For example, all the data and information may be entered into a CRM system. Consequently, the CRM system may allow a company to better target various customers based on that data and information.

Social CRM systems may coordinate with social media sites, such as Twitter®, LinkedIn®, Facebook® and Google Plus® to track and communicate with customers who share opinions and experiences about their company, products and services. The strategy may be based around customer engagement and interactions, with transactions being a byproduct. Social CRM system may be considered an evolved form of the traditional CRM system. In some instances, it may be desirable to have a back-end process and system for managing customer relationships and data in an efficient and process-centric way. Although, social CRM system may have different form depending on the organization, the purpose may be to understand the business challenge that is facing an organization and providing a possible solution. For example, social CRM systems may play a role in developing a social or collaborative business, both internally and externally.

In an embodiment, information within a CRM system (e.g. Sugar, Siebel) may be leveraged to facilitate instant message communications between individuals who may be commonly associated with and/or engaged in an opportunity that is maintained, managed, and/or documented within the CRM system. For example, various opportunity level relationships (contacts) may be inferred for the opportunities within the CRM system. A group of individuals associated with one or more opportunities may be created in the form of instant message buddy list group. The instant message buddy list group formed around, or based on, an opportunity within a CRM system may be propagated to at least some of the individuals associated with one or more opportunities.

An individual, such as a user of the CRM system, may be provided with an instant message buddy list that reflects the opportunities that the individual is part of, for example, in the form of groups of individuals associated with different opportunities. An individual may be provided with a number of these groups within his instant message buddy list (e.g., depending upon how many opportunities the individual is associated with), which may be included in the individual's instant message buddy list along with other contacts such business contacts, friend contacts and family contacts.

Referring to FIG. 1, there is shown a CRM for instant messaging (CIM) process 10. For the following discussion, it is intended to be understood that CIM process 10 may be implemented in a variety of ways. For example, CIM process 10 may be implemented as a server-side process, a client-side process, or a hybrid server-side/client-side process.

For example, CIM process 10 may be implemented as a purely server-side process via CIM process 10s. Alternatively, CIM process 10 may be implemented as a purely client-side process via one or more of client-side application 10c1, client-side application 10c2, client-side application 10c3, and client-side application 10c4. Alternatively still, CIM process 10 may be implemented as a server-side/client-side process via screen CIM process 10s in combination with one or more of client-side application 10c1, client-side application 10c2, client-side application 10c3, and client-side application 10c4. In such an example, at least a portion of the functionality of CIM process 10 may be performed by CIM process 10s and at least a portion of the functionality of CIM process 10 may be performed by one or more of client-side application 10c1, 10c2, 10c3, and 10c3.

Accordingly, CIM process 10 as used in this disclosure may include any one, or combination of, CIM process 10s, client-side application 10c1, client-side application 10c2, client-side application 10c3, and client-side application 10c4.

Figure 2:
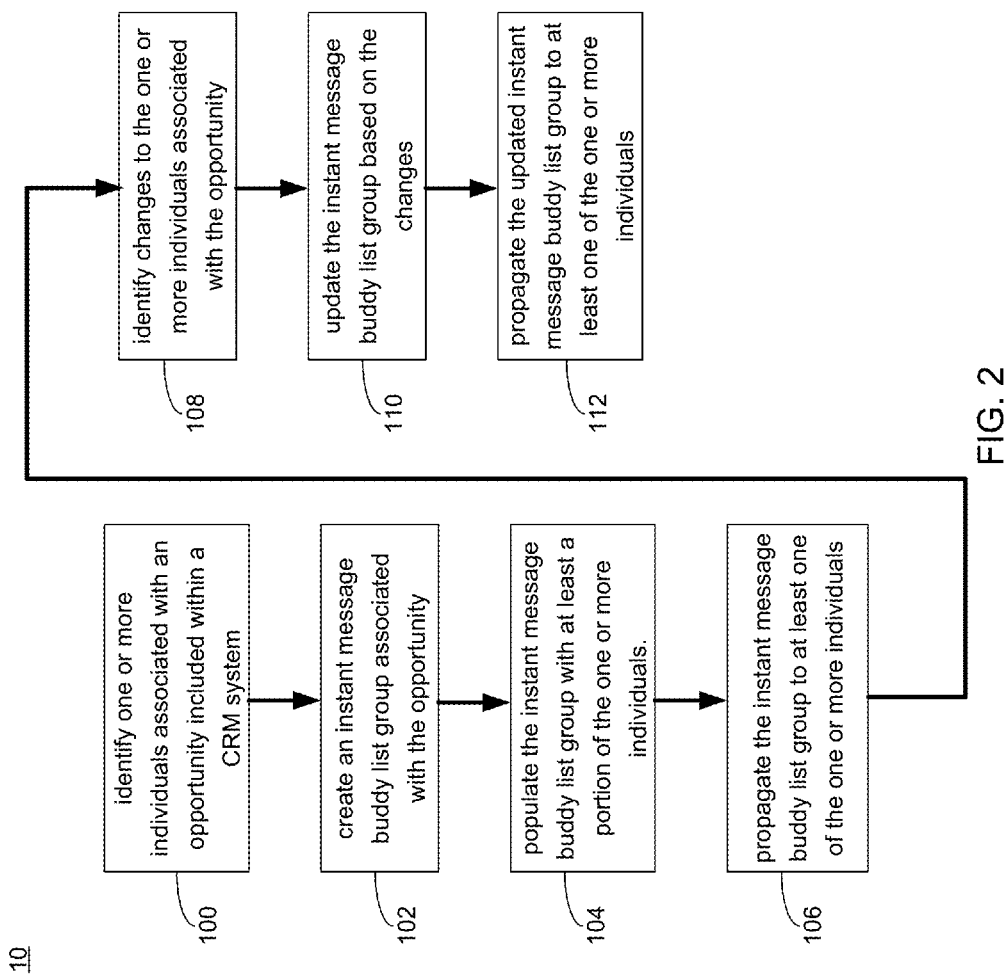
FIG. 2 is a flowchart of the CIM process of FIG. 1, according to an implementation of the present disclosure.

Referring also to FIG. 2, and as will be discussed in greater detail below, CIM process 10 may identify 100 one or more individuals associated with an opportunity included within a CRM system. CIM process 10 may also create 102 an instant message buddy list group associated with the opportunity. CIM process 10 may also populate 104 the instant message buddy list group with at least a portion of the one or more individuals.

CIM process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of CIM process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a client-side CRM application, a client-side instant message application, a web browser or a specialized application (e.g., an application running on a mobile platform). Examples of a client-side CRM application may include a client application for accessing and/or interacting with a CRM system such as Sugar or Siebel, or the like. (Sugar is a trademark of SugarCRM Inc. in the United States, other countries, or both; Siebel is a trademark of Oracle Corporation in the United States, other countries, or both.) The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access CIM process 10 directly through network 14 or through secondary network 18. Further, screen capture process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, CIM process 10 may communicate with, interact with, and/or included within a CRM system (e.g., CRM system 54), examples of which may include, but are not limited to, Sugar and Siebel. As is generally known, a CRM system (e.g., CRM system 54) may generally identify, manage and track customer information. As used herein, the term customer may include a current customer, a potential or future customer, a business partner, or the like. Changes to customer information may also be tracked within a CRM system. Various leads, contacts and opportunities (e.g., including but not limited to ongoing relationships, potentials for new or additional sales, interactions, services, leads that may be exploited, or the like) related to customer information may be identified, tracked and managed in a CRM system. As such, CRM system 54 may document and identify, track and manage customer information. Any changes to customer information that take place over time may be documented using CRM system 54. Other information, in addition to customer information, may also be documented or tracked by, or using, CRM system 54. In an embodiment, the data associated with, generated by, and/or collected by a CRM system may be stored, e.g., on storage device 16 associated with server computer 12, which executes CRM system, and/or another suitable storage device.

In some embodiments, CIM process 10 may communicate with, interact with and/or include a component or module of an instant messaging system (e.g., IM system 56). IM system 56 may generally allow transmission of a variety of messages from one user to one or more other users. Instant messaging is a form of communication that offers an instantaneous transmission of text-based messages over the Internet. Features offered by many instant messaging systems may include voice or video calling, video chat, inclusion of hyperlinks to media, ability to multicast communications to multiple recipients. Instant messaging may be possible between individuals and/or groups that reside in the same general location (e.g., a single corporate office) and/or individuals and/or groups that reside in different locations and/or form part of different IM communities.

In an embodiment, users may access CRM system 54, which may include a CRM server application (e.g., to identify, manage and track customer information such as opportunities) and/or IM system 56, which may include an IM server application (e.g., to send instant message communications to other users, manage instant message contact lists, user profiles, etc.) using suitable client side applications, such as specific CRM client side applications, IM client side applications, generic applications such as web browsers (e.g., which may allow web-access to CRM server application and/or IM server application), or combinations of specific client side applications and generic client applications.

As generally discussed above with reference to FIG. 2, CIM process 10 may identify 100 one or more individuals associated with an opportunity included within a CRM system. CIM process 10 may also create 102 an instant message buddy list group associated with the opportunity. CIM process 10 may also populate 104 the instant message buddy list group with at least a portion of the one or more individuals.

For example, CIM process 10 may identify 100 one or more individuals associated with an opportunity included within a CRM system. For example, CIM process 10, and/or another process or application, may interact with a CRM system (e.g., CRM system 54) and identify opportunities within the CRM system that are associated with specific individuals or users. As explained above, a CRM system may maintain information regarding a number of opportunities that are related to ongoing and/or past customer interactions, as well as potential and future customer interactions and communications, business ventures, and the like. Opportunities may be associated with one or more individuals. The users associated may include individuals who are involved in the customer relationship and/or the potential future relationship. For example, in the case of an opportunity including a past and/or ongoing customer, various individuals may have been involved in the relationship with the customer, e.g., in a sales capacity, service capacity, a technical support capacity, managerial capacity, and/or otherwise interacted with the customer or otherwise facilitated the business interaction with the customer. Similarly, for an opportunity representing a potential future relationship with a customer, users associated with the opportunity may include individuals who are indicated as having a contact relationship with the customer, who are in a sales and/or support position for products or services that may be pitched to the potential customer, and/or who have other skills or information that has been identified as being useful for exploiting the potential customer. The individuals associated with the opportunity may be explicitly identified in information and/or records associated with the opportunity. Further, in some situations, the individuals associated with the opportunity may be implicitly identified, e.g., based on communications or correspondence that may be associated with the opportunity in the CRM system. Further, users may belong to an enterprise that generated the opportunity or users may belong to an enterprise that was not involved in generating the opportunity (e.g., but may otherwise provide resources that may be useful for moving forward with the opportunity, such as outside technical support, etc.). For example, an enterprise may have created a list of opportunities within a CRM system that it wishes to share with another enterprise, and/or involve another enterprise in moving forward with the opportunity. In that scenario, the users from the other enterprise may not belong to the enterprise that created these opportunities.

Figure 3:
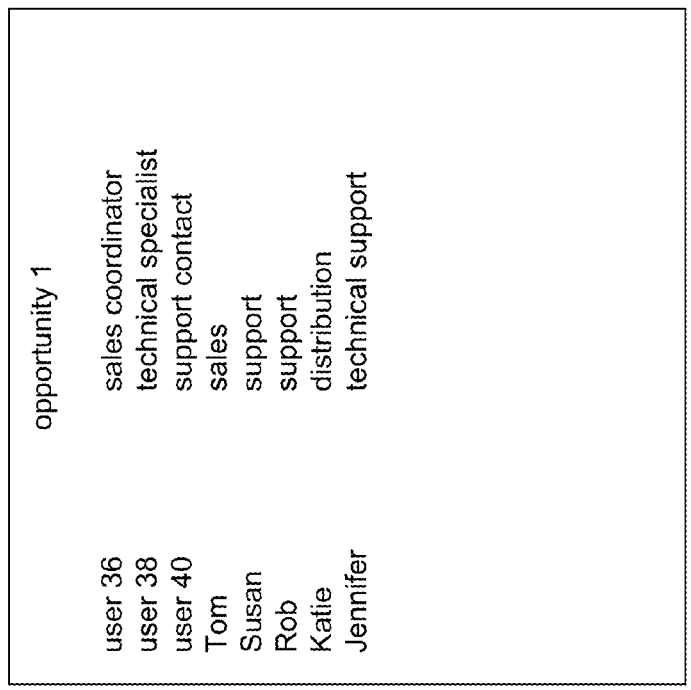
FIG. 3 is a diagrammatic representation of an example CIM process of FIG. 1, according to an implementation of the present disclosure.

In an embodiment, CIM process 10 may determine that an opportunity (e.g., opportunity 1) has one or more users associated with that opportunity (e.g., users 36, 38 and 40), for example, based on records and/or information associated with the opportunity that are maintained by the CRM system. CIM process 10, along and/or in conjunction with another process or application, may identify 100 users associated with certain opportunities. CIM process 10 may interact with a CRM system (e.g., CRM system 54) to access information regarding the opportunity to identify 100 one or more individuals associated with the opportunity. For example, and referring also to FIG. 3, multiple individuals (e.g., user 36, user 38, user 40, Tom, Susan, Rob, Katie, and Jennifer) may be associated with an opportunity (e.g., opportunity 1). As generally discussed above, the various individuals may be associated with opportunity 1 in various capacities and/or for various reasons, and the association of each of the individuals may be based on, at least in part, either an explicit or an implicit connection between the individual and opportunity 1. It is understood that the use of one opportunity is for illustrative purposes and not a limitation.

Figure 4:
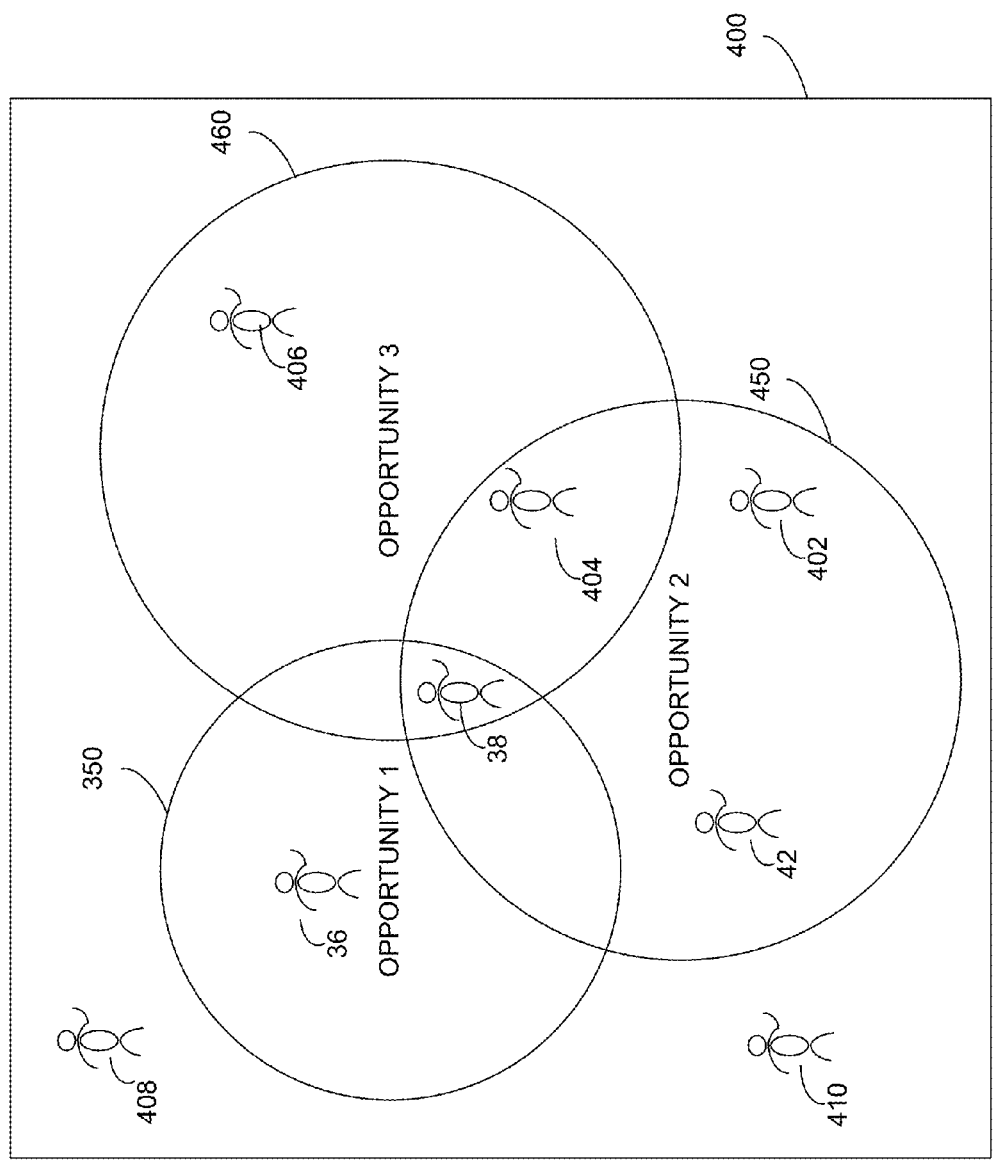
FIG. 4 is a diagrammatic representation of an example CIM process of FIG. 1, according to an implementation of the present disclosure.

As explained above, and referring also to FIG. 4, users may be associated with one or more opportunity. For example, user 38 may be associated with multiple opportunities (e.g., opportunity 1, opportunity 2 and opportunity 3) included in the CRM system. CIM process 10 may identify 100 a user (e.g., user 38) as associated with three opportunities (e.g., opportunity 1, opportunity 2 and opportunity 3). In addition to user 38, there may be other users associated with these opportunities. For example, CIM process 10 may identify 100 users 36, 38 and 40 to be associated with opportunity 1, users 38, 40, 42, 402 and 404 associated with opportunity 2, and users 38, 40, 404 and 406 associated with opportunity 3. It is understood that the above example is only for illustrative purposes and not a limitation.

CIM process 10 may also create 102 an instant message buddy list group associated with the opportunity. For example, CIM process 10 may interact with an IM system (e.g., IM System 56) and/or an instant messaging client application, e.g., which may include one or more of client applications 10c1-10c4) in order to manage the creation of one or more instant message lists (e.g., a buddy list). In general, an instant message buddy list may include a list of instant messaging contacts and screen names associated with each instant messaging contact. An instant message buddy list group may include an organizational tool in which one or more instant messaging contacts may be grouped together to provide a common context to the instant messaging contacts included within the instant message buddy list group. In some embodiments, instant messaging contacts included within the instant message buddy list group may be graphically connected in an instant message buddy list (e.g., in a common level in a tree structure, in a folder, via sequential listing, or the like). Such a graphical connection may facilitate understanding by a user of the instant message buddy list that the instant messaging contacts included in the instant message buddy list group may be contextually related. In various embodiments, buddy lists for an instant messaging user may be maintained on server side IM system (e.g., IM system 56) and/or may be maintained on a client side IM application. The server-side IM system and the client-side IM application communicate at regular or determined intervals in order to maintain an up-to-date buddy list associated with the instant messaging user.

Continuing with the above-stated example, CIM process 10 may create 102 an instant message buddy list group associated with the opportunity 1. For example, and referring to FIG. 5, CIM process 10 may create an instant message buddy list group 500 for opportunity 1. Buddy list group 500 may be created 102 within a buddy list (e.g., buddy list 502) associated with a user (e.g., user 36). While in the illustrated embodiment, buddy list group 500 is shown created 102 within buddy list 502 of a particular user (e.g., user 36), in other embodiments, this is for illustrative purposes only. In some embodiments, CIM process 10 may create 102 an instant message buddy list group within instant messaging system 56 in general, which may not be associated with a particular user. In such an embodiment, the instant message buddy list group may be, for example, maintained within a master contact list, e.g., which may include a listing of all users of instant messaging system 56. Additionally, in some embodiments CIM process 10 may create 102 the instant message buddy list group in response to, e.g., receiving a request to create 102 the instant message buddy list from a user (e.g., which request may be received via CRM system 54, IM system 56, and/or via another system, application, or process). In some embodiments, CIM process 10 may create 102 the instant message buddy list group, e.g., in response to identifying 100 one or more individuals associated with an opportunity included within CRM system 54, and/or may otherwise create 102 the instant message buddy list group.

Figure 5:
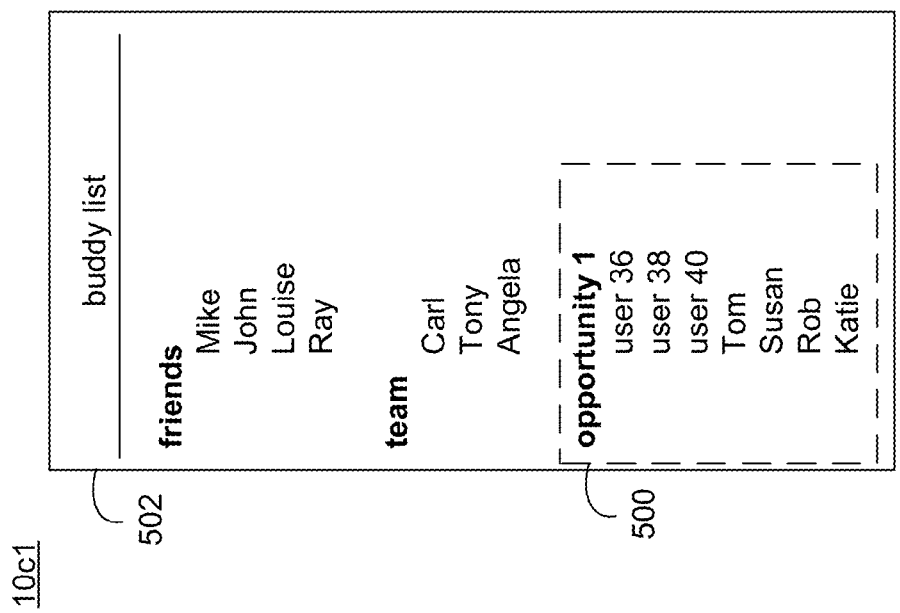
FIG. 5 is a diagrammatic representation of an example CIM process of FIG. 1, according to an implementation of the present disclosure.

CIM process 10 may also populate 104 the instant message buddy list group with at least a portion of the one or more individuals. For example, and as also shown in FIG. 5, CIM process 10 may populate 104 the buddy list group 500 for opportunity 1 with one or more users (e.g., users 36, 38 and 40, Tom, Susan, Rob, and Katie). As explained above, instant message buddy list group 500 may be created 102 based on, at least in part, the one or more individuals identified 100 as being associated with an opportunity (e.g., opportunity 1). In some embodiments, instant message buddy list group 500 may be populated 104 with all users associated with opportunity 1 or may contain a subset of the users associated with opportunity 1. For example, although Jennifer may be identified 100 by CIM process 10 as a user associated with opportunity 1, there may be reasons not include Jennifer in instant message buddy list group 500. For example, one or more rules may be defined (e.g., by a user, an administrator, default setting, or the like) for populating 104 the instant message buddy list group. As a consequence, although CIM process 10 may identify 100 that Jennifer is associated with opportunity 1, CIM process 10 may populate 104 the instant message buddy list group for opportunity 1 with users 36, 38 40, Tom, Susan, Rob, and Katie. It is understood that the above are only examples of buddy list groups and other groups may be utilized.

In some embodiments, an instant messaging screen name associated with each of the individuals populating the instant message buddy list group may be included within information and/or records associated with the opportunity within the CRM system. In such a situation, CIM process 10 may be capable of extracting the instant messaging screen name for the one or more individuals from the CRM records or information and may populate 104 the instant message buddy list group with the extracted instant messaging screen names. In some embodiments, CIM process 10 may otherwise obtain instant messaging screen names for at least a portion of the one or more individuals populating 104 the instant message buddy list group. For example, in some situations, an instant messaging screen name associated with one or more of the individuals may not be included within the information and/or records included within the CRM system. In some embodiments, CIM process 10 may obtain an instant messaging screen name for an individual, e.g., by accessing one or more other sources. Accessing the one or more other sources may include, for example, transmitting a request to such other sources, executing a search query against such other sources, or the like. Examples of other sources from which CIM process 10 may obtain instant messaging screen names for one or more of the individuals may include, an IM system (e.g., IM system 56, which may include a master directory of all users of IM system 56), an organizational directory (e.g., an LDAP directory), or other suitable source. CIM process 10 may otherwise obtain information for populating 104 the instant message buddy list group.

Figure 6:
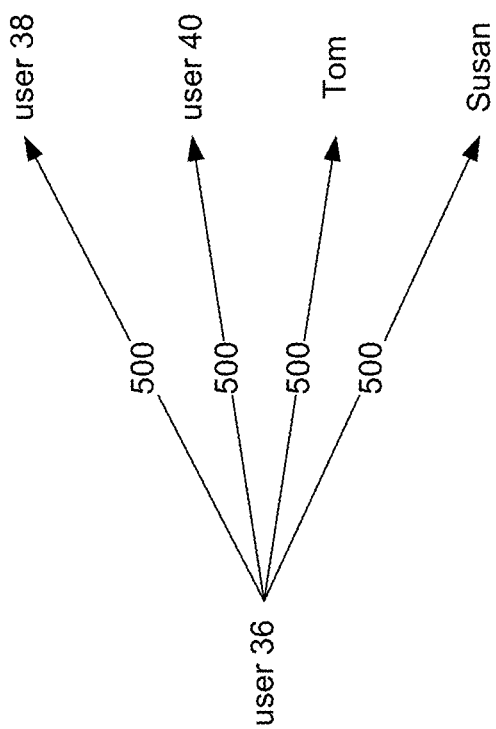
FIG. 6 is a diagrammatic representation of an example CIM process of FIG. 1, according to an implementation of the present disclosure.

CIM process 10 may further propagate 106 the instant message buddy list group to at least one of the one or more individuals. For example, instant message buddy list group 500 may be populated with a number of users (e.g., user 36, 38, 40, Tom Susan Rob, and Katie). Referring also to FIG. 6, instant message buddy list group 500 may be propagated 106 to at least one of the one or more individuals identified 100 as being associated with the opportunity. In some embodiments, the at least one of the one or more individuals may also be users of IM system 56 and/or CRM system 54. Propagating 106 instant message buddy list group 500 to the one or more other users may include, for example, sending instant message buddy list group 500 to the other users (i.e., sending the instant message buddy list group to a computing device associated with each intended recipient user). Upon receipt of instant message buddy list group 500, each of the receiving users may, for example, import instant message buddy list group 500 into an instant message buddy list of the user. In some embodiments, CIM process 10 and/or another process or application (e.g., an instant messaging client application) may automatically import instant message buddy list group 500 into an instant message buddy list of the user.

In some embodiments. CIM process 10 may propagate 106 instant message buddy list group 500 to the at least one of the one or more individuals including associating instant message buddy list group 500 with the at least one individual via IM system 56. For example, instant message buddy list group 500 may be associated with an instant message buddy list maintained on IM system 56 for each user to which instant message buddy list group 500 is propagated 106. In some embodiments, users may access instant message buddy list group 500 (e.g., for the purpose of engaging in an instant messaging communication with one or more users included within instant message buddy list group 500) via IM system 56 (and/or via another application, such as a client instant messaging application, a web browser, etc.). In some embodiments, IM system 56 may push instant message buddy list group 500 down to each respective user (i.e., to a computing device associated with each respective user) to whom instant message buddy list group 500 was propagated 106. In some such embodiments, a client instant messaging application may import instant message buddy list group 500 into an instant message buddy list for each respective user (e.g., as a result of an instant message buddy list synchronization operation performed by one or more of IM system 56, an instant messaging client application, and/or CIM process 10).

In some embodiments, the instant message buddy list group may be propagated 106 to each of the individuals identified 100 as being associated with the opportunity (e.g., user 36, user 38, user 40, Tom, Susan, Rob, Katie, and Jennifer for opportunity 1). In some embodiments, CIM process 10 may propagate 106 the instant message buddy list group (e.g., instant message buddy list group 500) to one or more users that are were not identified 100 as being associated with the opportunity. For example, the instant message buddy list group may be propagated 106 to an employee who is not associated with a particular opportunity, for example, as part of a company strategy to include additional individuals in already established and/or developing projects. For example a salesperson may be a new hire that has never been associated with an opportunity. In some embodiments, CIM process 10 process may propagate 106 the instant message buddy list group associated with the opportunity to the newly hired salesperson. In another example, CIM process 10 may propagate 106 the instant message buddy list group to a specific team in the organization (e.g., sustaining) for opportunities that have expressed complaints. It will be understood that the above is only an example and other conditions may trigger the propagation of the instant message buddy list group to users not associated with an opportunity. In addition/as an alternative to including individuals in addition to the one or more individuals identified 100 as being associated with the opportunity, in some embodiments CIM process 10 may propagate 106 the instant message buddy list group to less than all of the individuals identified 100 as being associated with the opportunity. For example, as shown in FIG. 6, CIM process may propagate 106 instant message buddy list group 500 to user 38, user 40, Tom and Susan. As such, instant message buddy list group 500 may not be propagated 106 to Rob and Katie, who were also identified 100 as being associated with opportunity 1. While in the illustrated embodiment of FIG. 6, instant message buddy list group 500 is shown as being propagated 106 from user 36 (i.e., from computing device 28 operated by user 36, for example via client application 10c1), this is for illustrative purposes only. As discussed above, in some embodiments, CIM process 10 may propagate 106 the instant message buddy list group, e.g., form CIM process 10s, from CRM system 54, from IM system 56, and/or from another application or process.

Consistent with the foregoing, in an embodiment, propagating 106 the instant message buddy list group may be based on one or more rules. For example, the CIM process 10 process may evaluate a set of rules defined by the system (i.e., CRM system 54 and/or IM system 54, and/or defined within CIM process 10) and/or defined by users or by an administrator of the system (i.e., CRM system 54, IM system 54, and/or CIM process 10) before propagating 106 the instant message buddy list group. Examples of rules that may be defined for propagating 106 the instant message buddy list group may be based on, but not limited to, a certain team or group within the organization; seniority, age group, job title and skill level. For example, a rule may be defined for a group of managers within an organization that receive all instant message buddy list groups belonging to opportunities that deal with sales transactions dealing with customers with income above a certain level. Another example may be for a rule that may be defined for certain salespersons that are within a certain age group that may receive an instant message buddy list group for opportunities that deal with same age group customers. It will be understood that above are only examples and not limitations, other example of rules may be envisioned.

As explained above and referring to FIG. 4, users may be associated with one or more opportunities, which may result in multiple instant message buddy list groups reflected in users' respective buddy lists. For example, CIM process 10 may identify 100 a user (e.g., user 40) as being associated with three opportunities (e.g., opportunity 1, opportunity 2 and opportunity 3). In addition to user 40, there may be other users associated with each of these opportunities. CIM process 10 may create 102 three instant message buddy list groups corresponding to the three opportunities (e.g., opportunity 1, opportunity 2 and opportunity 3) respectively. CIM process 10 may populate 104 each of the three instant message buddy list groups with at least a portion of the individuals identified 100 as being associated with each respective opportunity. CIM process 10 may propagate 106 each respective instant message buddy list group to at least a portion of the one or more individuals that are associated with each of the opportunities (e.g., opportunity 1, opportunity 2 and opportunity 3).

It should be noted that an instant messaging buddy list group for a particular user may not necessarily contain the user's own contact information. For example, as shown in FIG. 5, instant message buddy list group 500 included within instant message buddy list 502 belonging to user 36 is shown including user 36. In some embodiments, a user may not be included within an instant message buddy list group for that particular user. For example, in the case of instant message buddy list 502 associated with user 36, the contact information (e.g., screen name) for user 36 may not necessarily be included. As such, the instant message buddy list group may be customized for each individual to whom the instant message buddy list group is propagated 106. Other configurations may be equally utilized.

Consistent with the foregoing, one or more of the individuals associated with an opportunity that is included within a CRM system may be provided with an instant message buddy list group that may include instant messaging contact information (e.g., screen name) for one or more other individuals who are also associated with the opportunity. As such, instant messaging contact may be facilitated between the individuals who are associated with the opportunity. Facilitating instant messaging communications between individuals associated with an opportunity may improve interaction and collaboration amongst the individuals. Such improved interaction and collaboration may improve the ability of the individuals to take advantage of the opportunity, and the like.

In some embodiments, a first individual associated with the opportunity may not even need to specifically know the identity of the other individuals associated with the opportunity. For example, the first individual may simply access the instant message buddy list group for the opportunity, which may present the first user with the identity of one or more other individuals who are also associated with the opportunity. Presenting the first individual with such a list of the other individuals associated with the opportunity may facilitate the first individual determining a desired individual to contact, as well as facilitating instant messaging contact between the individuals. In this regard, while not shown, in some embodiments the instant message buddy list group associated with the opportunity may include information in addition to the screen name and/or real name of the individuals included within the instant message buddy list group. Such additional information may include, e.g., alternative contact credentials (such as email address, telephone number), organizational information (e.g., title, position, department, etc.), and/or other information. In some embodiments, information in addition to the instant messaging screen name may be obtained, for example, from an organizational directory, or other suitable source, as discussed above with regard to CIM process 10 populating 104 the instant message buddy list group. In addition/as an alternative to facilitating individual instant messaging communications between individuals associated with the opportunity, the instant message buddy list group may also facilitate group-wise instant messaging communications between all of the individuals included within the instant message buddy list group.

CIM process 10 may further identify 108 changes to the one or more individuals associated with the opportunity. For example, over time the individuals involved with a given project, client, or the like may change. Individuals may leave an organization, may join the organization, may transition between departments or jobs within an organization. As such, the individuals associated with a given opportunity may change over time. For example, CIM process 10 may have created 102 an instant message buddy list group (e.g., instant message buddy list group 500) that may be populated 104 with individuals (e.g., users 36, 38, 40, Tom, Susan Rob, and Katie) identified 100 as being associated with a certain opportunity (e.g. opportunity 1). If for example user 38 changed positions within the organization, CIM process 10 may identify 108 that a change has occurred to the users associated with opportunity 1 (e.g., that user 38 may no longer be associated with opportunity 1).

For example, in an embodiment, a user may initiate a change by updating the IM system (e.g., IM system 56) that the user is part of. For example, user 38 may update his or her IM status to indicate a new position title in the organization. CIM process 10 may interact with the IM system (e.g., IM system 56) in order to identify 108 that a change has occurred to user 38. In an embodiment, a user may initiate a change within a CRM system (e.g., CRM system 54). For example user 38 may change his or her association with a certain opportunity (e.g., opportunity 1). CIM process 10 may then identify 108 the change by interacting with the IM system (e.g., IM system 56) and/or the CRM system (e.g., CRM system 54). Further, in an embodiment, CIM process 10 may periodically and/or in response to an event (e.g., a change of a record within an opportunity) identify 100 the individuals associated with a given opportunity. Further, upon iteratively identifying 100 the individuals associated with the opportunity, CIM process 10 may compare the individuals iteratively identified 100 as being associated with the opportunity to with the individuals previously (and/or originally) identified 100 as being associated with the opportunity. In response to comparing the individuals associated with the opportunity, CIM process 10 may identify 108 a change in the individuals associated with the opportunity. It will be understood that the above are only examples and not limitations, other changes may be possible.

CIM process 10 may further update 110 the instant message buddy list group based on the changes. For example, having identified 108 that a change may have occurred, CIM process 10 may update 110 the instant message buddy list group associated with the opportunity to reflect the identified 108 changes, for example, in the form of an updated instant message buddy list group associated with the opportunity. Continuing with the above example in which user 38 has changed positions, and is no longer associated with opportunity 1, CIM process 10 may identify 108 the change to user 38 with respect to opportunity 1. According to an embodiment, CIM process 10 may update 110 the instant message buddy list group (e.g., instant message buddy list group 500) to reflect the change in user 38's position resulting in an updated instant message buddy list group (e.g., which may no longer include user 38 in an instant message buddy list group associated with opportunity 1).

Figure 7:
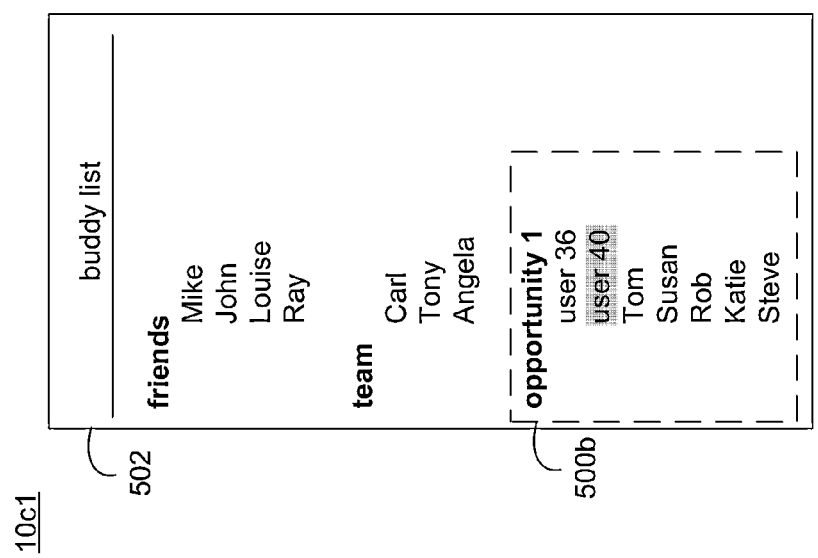
FIG. 7 is a diagrammatic representation of an example CIM process of FIG. 1, according to an implementation of the present disclosure.

In an embodiment, updating 110 the instant message buddy list group may include removing individuals from the instant message buddy list group. For example, and continuing with the above-example, CIM process 10 may identify 108 that user 38 has changed positions within the organization. This change may have caused user 38 no longer be associated with the opportunity (e.g., opportunity 1). As a result of this change, user 38 may not be appropriately included in the instant message buddy list group (e.g., instant message buddy list group 500) that was created 102 associated with opportunity 1). Referring also to FIG. 7, CIM process 10 may update 110 instant message buddy list group to remove user 38 from instant message buddy list group 500b.

As discussed above, CIM process 10 may update 110 the instant message buddy list group to remove a user, e.g., who may be explicitly no longer associated with the opportunity. In some embodiments, CIM process 10 may update an instant message buddy list group based on an individual's status or activity. For example, CIM process 10 may determine that an individuals engagement with the opportunity has become stale or not up-to-date. Examples of having stale engagement with the opportunity may include, but not limited to, the individual not logging in the CRM system for some time, the individual not having had activities related to the opportunity, or the individual having been flagged by CIM process 10 as no longer associated with an opportunity. For example, CIM process 10 may have determined that user 40 has not logged in to the CRM system for a certain period of time. In an embodiment, CIM process 10 may update 110 the instant message buddy list group to mark user 40 as being stale. For example, as shown in FIG. 7, updating 110 instant message buddy list group 500b to reflect user 40 becoming stale may include greying-out user 40 within an instant message buddy list group 500b. In some embodiments, if user 40 becomes increasingly stale (e.g., user 40's lack of engagement with the opportunity continues) for a defined period of time after becoming greyed-out, CIM process 10 may further update 110 instant message buddy list group 500b to remove user 40 from instant message buddy list group 500b associated with opportunity 1.

In an embodiment, updating 110 the instant message buddy list group may include adding individuals to the instant message buddy list group. For example, CIM process 10 may determine that an individual (e.g. Steve) has joined a specific team within an organization. The team may individuals who are associated with a certain opportunity (e.g., opportunity 1) and belonging to an instant message buddy list group (e.g., group 350). This addition of Steve to the team may have caused Steve to be associated with opportunity 1. As a result of this addition, CIM may identify 108 a change to an individual associated with opportunity 1, namely the new association of Steve with opportunity 1. Further, and as shown in FIG. 7, CIM process 10 may update 110 the instant message buddy list group to include Steve within instant message buddy list group 500b. According to various embodiments, CIM process 10 may identify 108 the change to an individual associated with the opportunity in a variety of manners. For example, CIM process 10 may iteratively identify 100 individuals associated with the opportunity (e.g., on a periodic basis; in response to a trigger such as a user request to identify individuals associated with the opportunity, an indication of activity with respect to the opportunity, etc.), CIM process 10 may receive an explicit indication of a change to an individual associated with the opportunity (e.g., from a user of the CRM system and/or from the IM system), and/or may otherwise identify 108 a change to an individual associated with the opportunity.

In an embodiment, updating 110 the instant message buddy list group may be done autonomously, e.g., without a user's involvement. For example, CIM process 10 may detect 108 a change in an individual's information, and/or association with the opportunity, e.g., through interactions with a CRM system (e.g., CRM system 54) and/or and IM system (e.g., IM system 56) or any other system that may reflect the user's information change, and CIM process 10 may automatically update 110 the instant message buddy list group in response to the change. In such an embodiment, as users are removed and added to opportunities the instant message buddy list group associated with the opportunities may be updated 110 by CIM process 10.

In some embodiments, CIM process 10 may provide one or more alerts transmitted to one or more users of the CRM system. For example, alerts may be in response to the CIM process 10 identifying 108 changes to the one or more individuals associated with the opportunity, and/or to changing 110 an instant message buddy list group and/or to propagating 104 of an instant message buddy list group or an updated 110 instant message buddy list group. The one or more alerts may be generated and transmitted to users (e.g., all or a portion of the individuals associated with the opportunity and/or all or a portion of the individuals included within the instant message buddy list group associated with the opportunity) based on default preferences, user preferences, or system preferences. The preferences may be established by system administrators or by the users of a CRM system or an IM system. Examples of preferences may be, but not limited to, frequency of the alerts, whether an alert should be sent and received, periodic intervals, information within the alert, identity of users and groups to receive the alerts. It will be understood that the above are only examples of alert preferences and not limitations, other examples may be implemented.

In an embodiment, the CIM process 10 may cause the updated instant message buddy list group to replace the original instant message buddy list group and/or may cause the updated instant message buddy list group to be maintained as separate instant message buddy list group. For example, if CIM process 10 may identify 108 a change in an individual associated with the opportunity, CIM process 10 may update 110 the instant message buddy list group based on these changes, in which the updated instant message buddy list group may be created as a new version of the original instant message buddy list group and/or may replace the original instant message buddy list group. Maintaining version control may allow, for example, a system administrator to analyze what information has changed. It will be understood that the above is only an example and other possibilities for maintaining the update instant message buddy list group may be possible.

In an embodiment, CIM process 10 may allow an IM system (e.g., IM system 56 or an IM client side application) to pull information related to users of an instant message buddy list group or an updated instant message buddy list group from a CRM system (e.g. CRM system 54 or a client side CRM system). In an another embodiment, CIM process 10 may permit a CRM system (e.g., CRM system 54 or a client side CRM system) to push information related to users of an instant message buddy list group or an updated instant message buddy list group to an IM system (e.g., IM system 56 or an IM client side application). CIM process 10 may permit the pushing or pulling of user information based on default preferences, user preferences, or system preferences. CIM process 10 may permit these preferences may be established by system administrator or by users of the CRM system. Examples of preferences may be, but not limited to, frequency of the pushing and pulling, amount of user information to pushed or pulled and the type of user information to be pulled or pushed. For example, the user data may be mined nightly, weekly, monthly or any appropriate interval. It will be understood that the above are only examples of alert preferences and not limitations, other examples may be implemented.

CIM process 10 may further propagate 112 the updated 110 instant message buddy list group to at least one of the one or more individuals. For example, as a result of identifying 108 a change to one or more individuals associated with an opportunity, CIM process 10 may update 110 an instant message buddy list group, which may result in an updated instant message buddy list group (e.g., updated instant message buddy list group 500b shown in FIG. 7). The updated instant message buddy list group may be propagated 112 to at least one of the users that have been originally identified 100 by CIM process 10 to be associated with a certain opportunity (e.g., opportunity 1), and/or added to the instant message buddy list group by the update 110. Updated 110 instant message buddy list group 500b may be propagated to at least one of the one or more individuals associated with the opportunity in a manner generally similar to propagating 106 the instant message buddy list group described with respect to FIG. 6.

Figure 8:
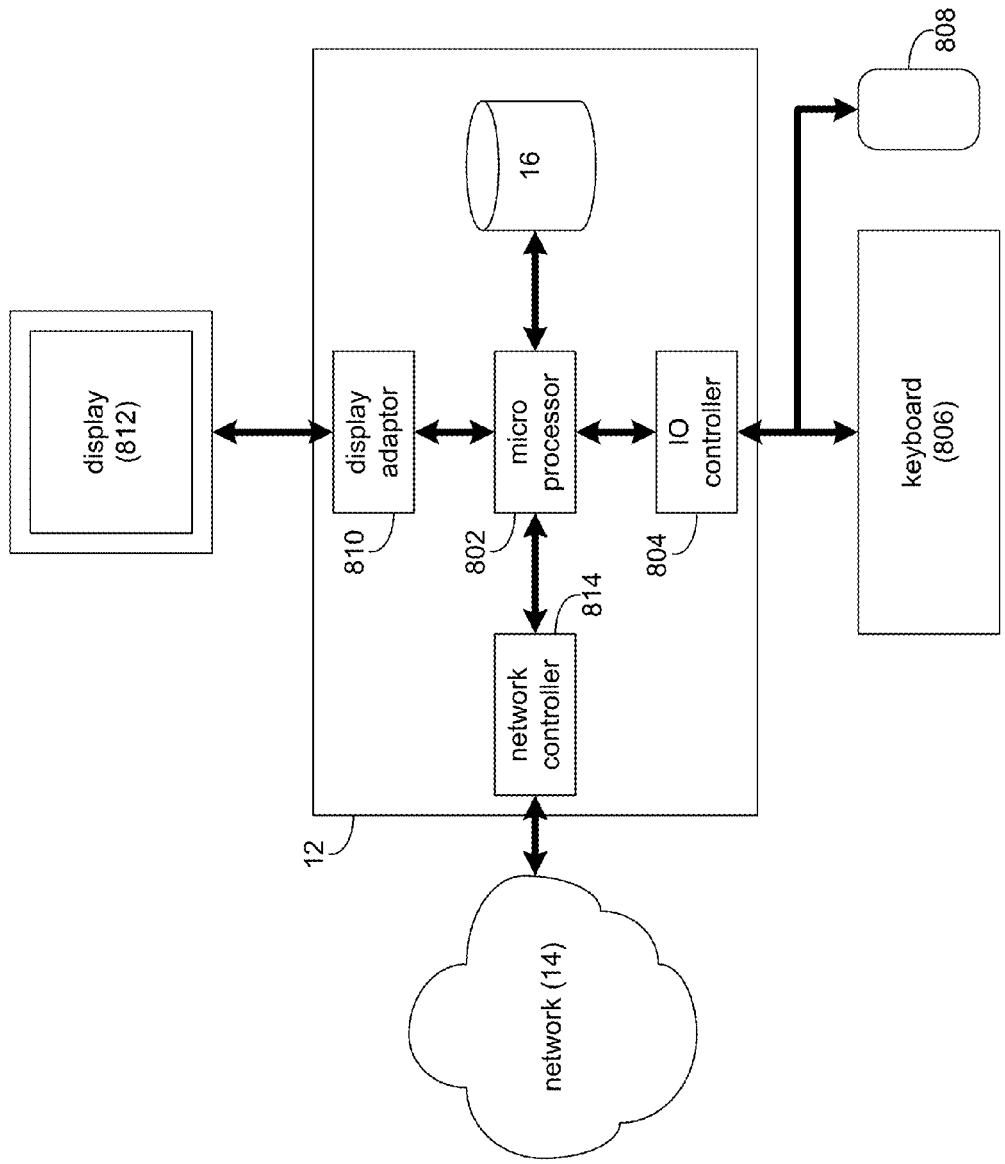
FIG. 8 is a diagrammatic view of the computing device of FIG. 1, according to an implementation of the present disclosure.

Referring also to FIG. 8, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, CIM process 10 may be substituted for computing device 12 within FIG. 8, examples of which may include but are not limited to client electronic devices 28, 30, 32, 34.

Computing system 12 may include microprocessor 802 configured to e.g., process data and execute instructions/code for screen capture process 10. Microprocessor 802 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 804 may be configured to couple Microprocessor 802 with various devices, such as keyboard 806, mouse 808, USB ports (not shown), and printer ports (not shown). Display adaptor 810 may be configured to couple display 812 (e.g., a CRT or LCD monitor) with microprocessor 802, while network adapter 814 (e.g., an Ethernet adapter) may be configured to couple Microprocessor 802 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 802) of a general purpose computer/special purpose computer/other programmable data processing apparatus (e.g., computing device 12), such that the instructions, which execute via the processor (e.g., processor 802) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
identifying, by one or more processors, one or more individuals associated with an opportunity included within a customer relationship management (CRM) system based upon, at least in part, records and information associated with the opportunity, the opportunity including one or more of an ongoing customer relationship, a past customer relationship, and a potential future customer relationship;
creating, by the one or more processors, an instant message buddy list group associated with the opportunity;
populating, by the one or more processors, the instant message buddy list group with at least a portion of the one or more individuals including extracting an instant messaging screen name for at least one of the one or more individuals from the records and information within the CRM system, wherein a portion of the one or more individuals associated with the opportunity is excluded from populating the instant message buddy list group based upon one or more exclusion rules;
propagating the instant message buddy list group to at least one of the one or more individuals;
propagating the instant message buddy list group to at least one person not identified as being directly associated with the opportunity based upon, at least in part, one or more of a seniority of the person, a job title of the person, and a skill level of the person;
identifying, by the one or more processors, an opportunity change of the one or more individuals associated with the opportunity;
determining, by the one or more processors, a staleness of at least one individual with respect to the opportunity; and updating, by the one or more processors, the population of the instant message buddy list group based on the opportunity change wherein the least one individual is removed from the instant message buddy list after a defined time period of staleness, and wherein an alert is generated based upon the determination of staleness.

2. The method of claim 1, wherein propagating the instant message buddy list group is based on one or more rules.

3. The method of claim 1, wherein updating the instant message buddy list group includes removing an individual from the instant message buddy list group.

4. The method of claim 1, wherein updating the instant message buddy list group includes adding an individual to the instant message buddy list group.

5. The method of claim 1, further including propagating the updated instant message buddy list group to at least one of the one or more individuals.

6. The computer-implemented method of claim 1, further including if the instant messaging screen name for at least one of the one or more individuals is not included within the records and information within the CRM system, extracting the instant messaging name for at least one of the one or more individuals from one or more other sources.

7. The computer-implemented method of claim 6, wherein the one or more other sources includes one or more of an instant messaging system and an organizational directory.

8. The method of claim 1, further including representing the at least one individual as greyed out in an instant message buddy list user interface for the instant message buddy list group.

9. The method of claim 1, wherein updating the instant message buddy list group includes maintaining version control of the instant message buddy list group.

* * * * *